Figure 1:
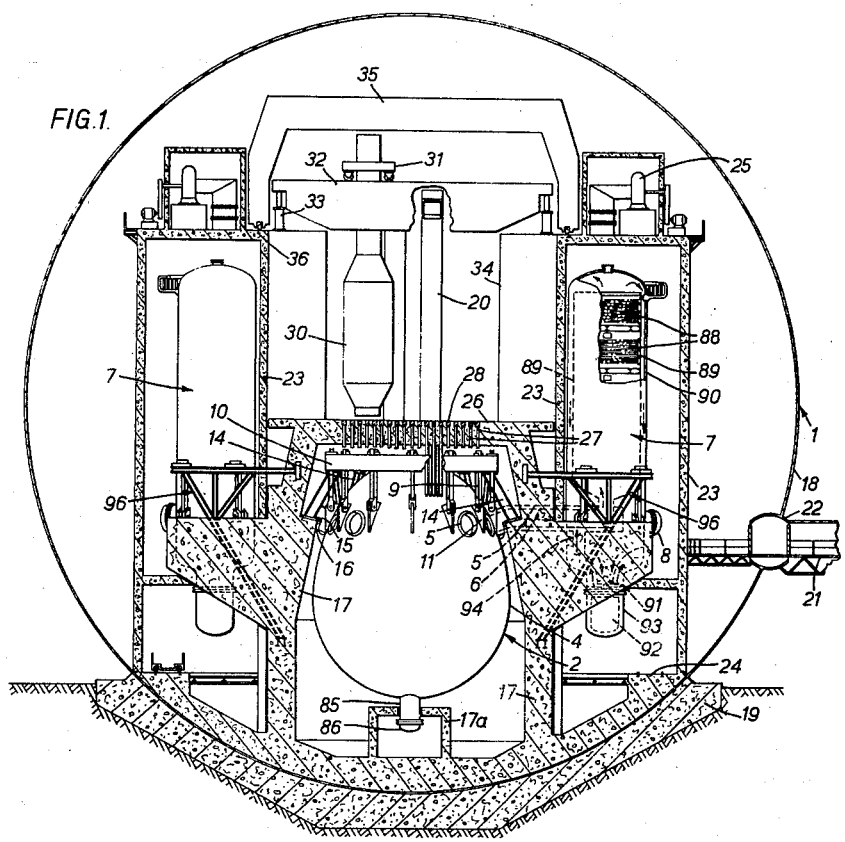

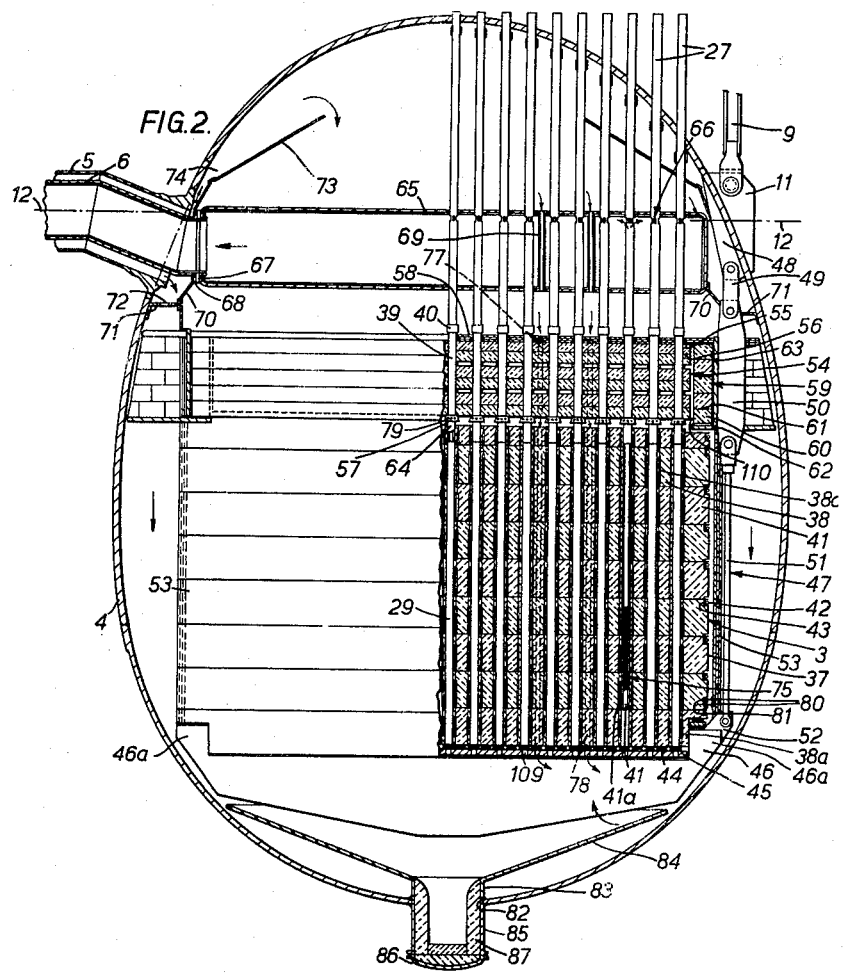

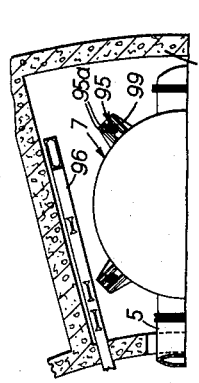
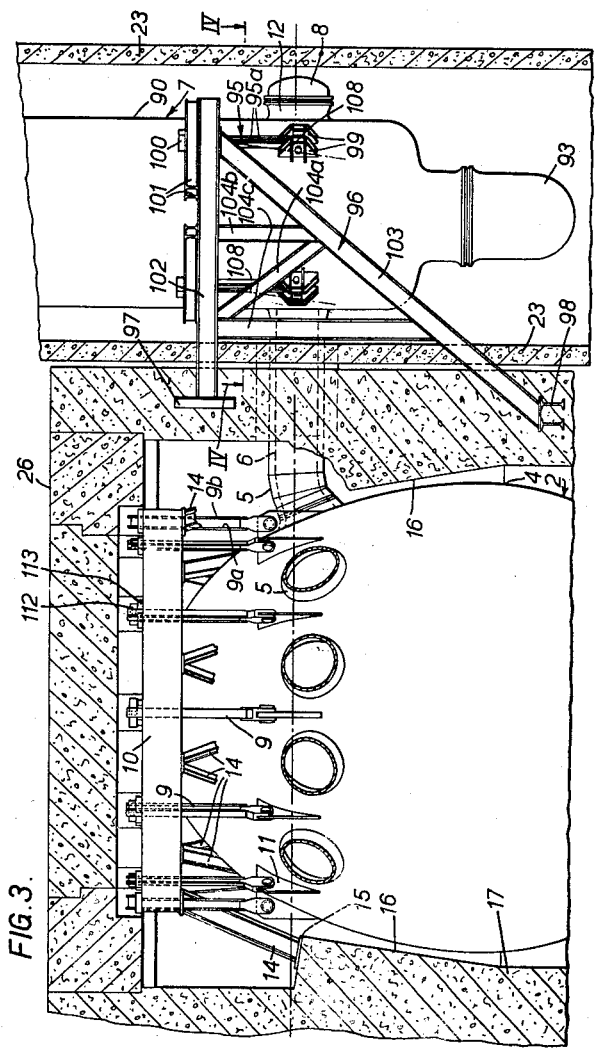
FIG. 4.
FIG. 3.

United States Patent Office 3,192,121
Patented June 29, 1965

3,192,121
NUCLEAR REACTOR SYSTEMS
Ronald Scott Challender, Warrington, John Michael Laithwaite, Wilmslow, William Thexton Lawton, Sale, and Jack Jones Griffiths, St. Anns, England, assignors to United Kingdom Atomic Energy Authority, London, England
Filed Nov. 1, 1961, Ser. No. 149,451
Claims priority, application Great Britain, Nov. 2, 1960, 37,741/60
10 Claims. (Cl. 176—60)

This invention relates to nuclear reactor systems of the kind comprising a reactor core contained within a pressure vessel, the vessel having co-axial inlet and outlet coolant ducts connecting with a heat exchanger, and means for circulating a pressurised coolant in closed circuit through the reactor core and heat exchanger, the vessel and heat exchanger being supported in a common plane which is also the plane of the co-axial ducts and the heat exchanger being movable with respect to the pressure vessel so as to relieve thermal stresses in the ducts.

One system of the kind described above is disclosed in co-pending British application 25,799/58 and has received publication in French patent specification No. 802,445.

The system described in British application No. 25,799/58 is substantially that used in the British Advanced Gas Cooled Reactor (A.G.R.) which could be described as a prototype reactor. It produces 100 mw. of heat. For a commercial reactor to be constructed based on this prototype one must consider designs producing 1000 mw. of heat and accordingly one thinks of departing from the cylindrical pressure vessel of A.G.R. and using instead a spherical or spheroidal vessel. (It is of interest to note that a similar development took place from the British Calder gas-cooled reactor with its cylindrical vessel to the spherical vessels used in gas-cooled commercial reactors under construction at the present time.)

The use of a spherical vessel in a reactor system of the kind referred to above introduces certain problems which the present invention is intended to meet. The invention also introduces advantages which enable greater power to be developed for limiting pressure vessel dimensions and introduces features leading to improved construction.

According to the present invention a reactor system of the kind described is characterised in that the reactor core is contained within a spherical or spheroidal pressure vessel (generically hereinafter referred to as a spheroidal pressure vessel), that the vessel is supported in its upper regions from hangers depending from a support structure, said structure being carried on struts matched with the hangers so as to maintain the position of the plane of the co-axial ducts constant, and that the core is carried on a grid structure supported by hangers from the plane of the co-axial inlet and outlet ducts.

The invention is seen to provide a number of advantages when compared with the known arrangement described in the co-pending British application 25,799/58. In the first place the support of a spheroidal vessel becomes possible. Whilst a cylindrical vessel can be readily supported in its upper regions on corbels in close proximity to the vessel, a spheroidal vessel cannot be so treated as, in its upper regions, the supports are necessarily a long way from any support structure which gives diametral clearance for the pressure vessel. The core grid structure, which, in A.G.R. for example, supported from the pressure vessel and which would give rise to complex bending movements in the vessel if so applied to a spheroidal vessel is now supported by hangers from the upper region of the vessel in the same plane as the hangers for the pressure vessel. At the same time the hangers which support the grid structure can occupy a part of a void in the spheroidal vessel which, with a conventional cylindrical core structure, is normally not utilised and hence the hangers need not cause any substantial increase in the dimension of the vessel in order to accommodate them. Put in another way, the spheroidal vessel can be designed as large as possible and the core can be designed as large as the vessel allows and the hangers can still be accommodated without substantial modification to vessel or core dimensions. This is particularly the case when a grid of stepped pattern is used and the core is stepped in the bottom reflector regions to fit into the grid.

A nuclear reactor system embodying the invention will now be described by way of example with reference to the accompanying drawings wherein:

FIGURE 1 is a side view, in section of the system,
FIGURE 2 is a sectional view of the reactor core and pressure vessel,
FIGURE 3 is an enlarged detail of FIGURE 1, and
FIGURE 4 is a half section taken on the lines IV—IV of FIGURE 3.

Referring first to FIGURES 1 and 2, a nuclear reactor system 1 includes a nuclear reactor 2 comprising a reactor core 3 contained within a pressure vessel 4 of spheroidal shape in a concrete biological shielding 17, the vessel 4 having, in its upper regions, co-axially disposed inlet and outlet coolant ducts 5, 6 of generally horizontal run which connect the pressure vessel 4 with eight heat exchangers 7. The pressure vessel 4 is hung in its upper regions from twelve equi-spaced steel hangers 9 depending from a support structure in the form of a ring beam 10 disposed above the vessel 4. The lower ends of the hangers 9 are pin-jointed to steel brackets 11 welded to the outer wall of the pressure vessel 4 and lying in the plane of the ducts 5, 6. The upper ends of the hangers 9 are welded to steel blocks 112, 113 (FIGURE 3) welded in turn to the upper face of the beam 10. The beam 10 is supported from below by twelve pairs of steel struts 14 extending upwards from an upper face 15 of a base support corbel 16 integral with the shielding 17. The struts 14 are formed from beams of I-section inclined inwards towards the pressure vessel 4.

The hangers 9 and struts 14, being close to one another in the same environment, are subjected to approximately the same temperature. The actual difference in temperature is small, the hangers 9 being of slightly higher temperature because of their greater proximity to the heat-generating reactor core 3. Differentials in thermal expansion of the hangers 9 and struts 14 (the former is of high-tensile steel and the latter of mild steel) are matched so as to maintain the position of the plane of the ducts 5, 6 constant in relation to the corbel 16 with temperature changes in the reactor system 1 by making the struts 14 of greater length than the hangers 9. The hangers 9 each comprise a pair of steel strips 9a, 9b interconnected at their extremities by end couplings providing connection with the brackets 11 and blocks 112, 113. The hangers 9 are disposed (see also FIGURE 3) so that the major axes of cross section of the strips 9a, 9b of each hanger 9 are at right angles to an imaginary line extending radially from the centre of the pressure vessel 4. In this position, the movement of inertia of the hanger, taken about an axis parallel to said major axes, is a minimum and the hanger thus offers low resistance to radial expansion of the vessel 4.

The struts 14 are arranged in pairs to form a ring of "V-like" supports disposed around the corbel 16 (see FIGURE 3), adjacent pairs being braced against one another as shown to provide a strong support.

The reactor 2 and heat exchangers 7 are housed within a steel containment vessel 18 of spherical form which is supported on a concrete raft 19. Ventilating air is circulated within the containment vessel 18 through ducts 20 and access is gained to the containment interior by way of cat-walk 21 and an air lock 22.

The heat exchangers 7 are enclosed in concrete biological shielding 23, the lower ends of which are integral with a concrete structure 24 which supports the biological shielding 17. The weight of the heat exchangers 7 is taken by the shielding 17 in a manner to be described and the combined weight of the reactor 2 and auxiliary equipment, heat exchangers 7, shielding 17 and shielding 23 is taken by the concrete structure 24 and transmitted through the walls of the containment vessel 18 to the concrete raft 19. The concrete shieldings 17 and 23 are cooled by air circulated by fans 25 and later discharged to the atmosphere outside the containment vessel 18.

The upper face of the shielding 17 defines a reactor charge face 26 and stand pipes 27 closed by removal caps 28 extend downwardly from the charge face 26 to penetrate the upper end of the pressure vessel 4 and terminate above fuel element coolant channels 29 (FIGURE 2) penetrating a graphite moderator and reflector structure 37 forming, with the reactor fuel, the reactor core 3. "On-load" refuelling of the reactor 2 is carried out by a refuelling machine 30 incorporating a pressure vessel housing a fuel storage magazine. The refuelling machine 30 is traversable across the charge face 26 on a carriage 31 supported on a gantry 32. The gantry 32 is movable on tracks 33 carried by the shielding 23. A further gantry 35 movable on tracks 36 also carried by the shielding 23 is provided for lifting work of a general nature about the charge face 26.

The graphite moderator and reflector structure 37 (FIGURE 2) is of cylindrical form and is composed of upright columns of graphite bricks 38 of rectangular cross-section with the grain of the graphite running parallel to their axes. The bricks 38 have cut away portions 38a at their side faces to accommodate Wigner growth in direction perpendicular to their axes (i.e. the direction of maximum Wigner growth). Most of the bricks 38 are penetrated from end to end to define the fuel element coolant channels 29, the exception being the bricks 38 at the periphery of the structure 37, which bricks form a side reflectory and are not penetrated. The structure 37 is held together around its periphery by elastic restraint bands 42 (of the type disclosed in U.K. specification No. 782,922) located in grooves 43 cut in the outer side faces of the outer bricks 38. The structure 37 is supported on ball bearings 44 carried on a thick plate 45 mounted on a steel grip support 46. The grid support 46 has a stepped portion 46a extending around its periphery which locates a complimentary stepped portion 38a of the bricks 38 forming the lower part of the reflector. The plate 45 is perforated by apertures 109 which register with the lower ends of the fuel element channels 29.

The grid support 46 is hung by twelve steel hangers 47 from steel brackets 48 welded to the inner walls of the pressure vessel 4 opposite the brackets 11 on the outer walls thereof, so that the hangers 47 are co-extensive with the hangers 9 supporting the pressure vessel 4. The hangers 47 each comprise a pair of links 49 pin-jointed to the bracket 48 and to a fish-plate 50, the fish-plate being pin-jointed in turn to a tie-rod 51 pin-jointed to a bracket 52 welded to the periphery of the grid-support 46.

The moderator structure and reflector structure 37 is bounded by a thermal shield composed of steel plates 53 disposed in layers. A neutron shield 54 is disposed above the structure 37 and is composed of alternate layers of graphite bricks 55 and boron-steel plates 56. The bricks 55 and plates 56 are penetrated by tubes 39, the upper ends of which are connected by flexible couplings 40 to the lower ends of the standpipes 27. The lower ends of the tubes 39 are supported on hollow stools 57 carried on the upper ends of short tubes 64 fitted in the upper ends of the fuel element channels 29 in the structure 37. The stools 57 also support the neutron shield 54 and are provided with apertures 79 which provide communication with the interior of the tubes 64 and hence the channels 29.

A thermal shield composed of layers of steel plates 58 rests upon the neutron shield 54. The neutron shield 54 is bounded by a further neutron shield 59 composed of alternate layers of graphite bricks 60 and boron-steel plates 61. The neutron shield 59 is carried on a steel base 62 and is bounded by a thermal shield formed by a steel ring 63. The ring 63 is welded to the base 62 and the base 62 welded in turn to the inner edges of the fish-plates 50. The plates 58 above neutron shield 54 extend outwardly to above the neutron shield 59 also. The neutron shields 54, 59 are spaced by an annular gap 110 to accommodate relative expansions in a radial direction. The couplings 40 allow relative movement between the standpipes 27 and the tubes 39.

A coolant manifold or header 65 disposed above the neutron shield 54 is penetrated by the standpipes 27 and is welded thereto to form a rigid structure. That portion of each standpipe 27 disposed within the header 65 is provided with coolant out-flow ports 66. The header 65 has a series of flanged openings 67 connected to flanged ends 68 of the coolant ducts 6 and the header is further penetrated by a series of tubes 69, the respective ends of which are welded to the top and bottom plates of the header. The tubes 69 define coolant in-flow passages through the header 65.

An annular baffle 70 extends from the upper face of the neutron shield 59 to the header 65. Another baffle 71 extends from the side of the baffle 70 to the walls of the pressure vessel 4 and is penetrated by coolant flow apertures 72. A further baffle 73 extends from the vicinity of the header 65 towards the upper end of the pressure vessel 4 to define, with the upper walls of the vessel, an annular passage 74.

The reactor 2 is fuelled with fuel element stringers 75 (one stringer only being shown) disposed in the fuel element coolant channels 29. The fuel stringers comprise clusters of rod-like fuel elements each formed by a stack of $UO_2$ fuel pellets enclosed in a thin sheath of stainless steel. The stringers 75 are supported within and enclosed by graphite sleeves 41 defining annular flow paths 41a with the walls of the channels 29. The sleeves 41 are suspended from support members (not shown) disposed in the tubes 39 penetrating the neutron shield 54. Alternatively, the fuel stringers 75 may be supported at their lower ends by suitable support means carried by the plate 45 on the grid support 46.

$CO_2$ gas coolant enters the pressure vessel 4 by way of the ducts 5 to divide into two equal fractions, the first fraction passing downwardly through the apertures 72 in the baffle 71 to pass between the vessel 4 and the thermal shield formed by the steel plates 53 and the second fraction passing upwardly between the baffle 73 and the vessel 4 before passing downwardly through the tubes 69 in the header 65. From the tubes 69 the second fraction flows through passages 77 penetrating the inner neutron shield 54 and then divides so that about 18% of the flow passes through passages 78 penetrating the moderator structure 37 and the remainder through the apertures 79 in the stools 57 and from thence to the annular paths 41a between the graphite sleeves 41 and the walls of the channels 29. Thus the first coolant fraction removes heat both from the pressure vessel 4 and the steel plates 53 forming a thermal shield and the second fraction removes heat from the standpipes 27, the neutron shield 54 and the moderator structure 37. The two fractions then combine to pass in counterflow upwardly through the graphite sleeves 41 and thus over the fuel element stringers 75 to remove heat from the stringers before collecting in the header 65 to pass out of the pressure vessel 4 by way of the ducts 6. Coolant is prevented from flowing upwardly between the moderator structure 37 and the steel plates 53 by peripheral seals 80 (of the type disclosed in U.K.

specification No. 788,902) extending radially inwards from the plates 53 into slots 81 in the sides of the graphite bricks 38 at the periphery of the moderator and reflector structure 37.

The lower end of the pressure vessel 4 has an aperture 82 bounded by a ring base 83 supporting a structure 84 of tundish-like form formed by thick steel plate. A tubular extension 85 of the ring base 83 projects beneath the vessel 4 and is closed by a removable cover 86. The ring base 83, extension 85 and cover 86 are provided with a graphite lining 87. The structure 84 provides thermal shielding of the lower end of the pressure vessel 4; it protects the vessel 4 from damage in the event of a fuel element stringer 75 being inadvertently dropped during a refuelling operation and it provides a heat sink in the event of any of the reactor fuel elements melting due to overheating. The graphite lined extension 85 serves as a collecting vessel for debris and melted metal which is then removed after shut-down of the reactor 2 by lowering of the cover 86 with aid of remote-operated equipment under cover of concrete biological shielding 17a (FIGURE 1).

The heat exchangers 7 comprise banks of water tubes 88 stacked in columns within tubular baffles 89 housed in pressure shells 90. Heated coolant outflowing from the reactor 2 by way of the ducts 6 is drawn upwardly by blowers 91 over the tubes 88 to give up heat in the generation of steam before passing in counterflow between the baffles 89 and pressure shells 90 to be returned to the reactor 2 by way of short ducts 94 connected to the ducts 5. The blowers 91 are driven by electric motors 92 housed in pressure-tight casings 93 (the arrangement is disclosed in British co-pending application No. 31,119/58 which is published as French patent specification No. 804,825) attached to the lower ends of the pressure shells 90. The casings 93 and the motors 92 are removable from the pressure shells 90 for maintenance of the blowers 91. Access to within each heat exchanger 7 is provided by removing a cover 8 from a manhole 12.

The heat exchangers 7 are supported by four equi-spaced hangers 95 (FIGURE 3) depending from support brackets 96 attached to support beams 97, 98 set in the concrete biological shielding 17. The lower ends of the hangers 95 are pinned to pairs of brackets 99 welded to the pressure shells 90 in the plane of horizontal sections of the ducts 5, 6. The upper ends of the hangers 95 are attached to steel blocks 100 welded to pairs of beams 101 welded in turn to the brackets 96, each beam 101 of a pair being disposed on either side of a hanger 95. The hangers 95 are of laminated form, each hanger being formed by a number of steel strips 95a inter-connected at their extremities by the brackets 99 and blocks 100. Preferably the hangers 95 are disposed as shown in FIGURE 4 that is, wherein the major axes of cross-section of the strips 95a are at right angles to the line of the ducts 5, 6 so that the moment of inertia of a hanger 95, taken about an axis at right angles to the line of the adjacent ducts, is a minimum. The hangers 95, therefore, when disposed in these positions, offer low resistance to axial expansion of the ducts 5, 6. In these positions, however, the hangers 95 offer high resistance to radial expansion of the heat exchangers 7. Although radial expansion of the heat exchangers 7 is much less than the axial expansion of the ducts 5, 6 (the respective ratios of expansion are in the order of 1:4), resistance to radial expansions can be reduced by disposing the hangers 95 so that the major axes of cross-section of the strips 95 are inclined to the line of the ducts 5, 6. An optimum positioning would be wherein the said major axes are at right angles to the resultant of the components of axial expansion (of the ducts 5, 6) and radial expansion (of the heat exchangers 7).

The support brackets 96 each comprise a horizontally disposed beam 102, a main support strut 103 and intermediate support struts 104a, 104b and 104c. The positions of the brackets 99 on the pressure shells 90 of the heat exchangers 7 are such that when the heat exchangers are cold, the lower ends of the hangers 95 are inclined from the vertical as indicated by the dotted lines 108.

Consider now the reactor 2 and heat exchangers 7 upon start-up of the reactor. As the reactor 2 and heat exchangers 7 warm up and thermal expansion occurs in all the associated components, longitudinal expansion of the ducts 5, 6 causes the lower ends of the hangers 95 to move away from their original positions indicated by the dotted lines 108, to take up the positions shown in full lines whilst the heat exchangers 7 remain vertical. This movement of the lower ends of the hangers 95 takes place along a path substantially close to the plane of the ducts 5, 6. Thus the plane of support of the heat exchangers remains substantially that of the ducts 5, 6 (and also the pressure vessel 4) under all conditions of thermal expansion.

The arrangement of the hangers 47 and 9 on co-extensive axes substantially reduces the inducement of complex stresses in the pressure vessel 4 due to bending moments, so that, in effect, the pressure vessel merely serves as an envelope to contain the reactor coolant.

Further details of the reactor system are as follows.

(a) Moderator and reflector structure 37:
 Diameter ---------------- 34 ft.
 Height ------------------ 18 ft.
 Radial thickness of reflector - 1 ft. 8 in.
 Axial thickness of reflector ---------------- 2 ft.
 Number of fuel element channels ---------------- 850.
 Brick material ----------- Grade A pile graphite.
 Cross-section of bricks ---- 12.65 in. x 10.955 in.
 Length of bricks --------- 31 in.
 Diameter of fuel element channels ---------------- 6.68 in.
 Total weight of graphite ---- 842 tons.

(b) Pressure vessel 4:
 Design pressure ---------- 330 p.s.i.g.
 Allowable stress --------- 15,700 p.s.i.
 Overall length ----------- 61 ft. 2⅜ in.
 Maximum external diameter ------------------- 47 ft. 10 in.
 Total weight ------------- 560 tons.
 Material ----------------- Silicon-killed mild steel.
  (i) Top dome:
   Plate thickness ------ 5 in.
   Internal diameter --- 40 ft.
  (ii) Bottom dome:
   Plate thickness ------ 3⅜ in.
   Internal diameter --- 46 ft.
  (iii) Intermediate section:
   Plate thickness ------ 5 in.
   Internal radius (horizontal section) ---- 23 ft. 6 in.
   Internal radius (vertical section) --------- 47 ft.
   Diameter of duct openings --------- 5 ft. 3 in.

(c) Neutron shield 54:
 Diameter ---------------- 36 ft.
 Thickness --------------- 5 ft. 6 in.
 Total thickness of boron steel ------------------- 2¼ in.
 Total weight of graphite ---- 310 tons.

(d) Flows and temperatures through pressure vessel:
 Total gas flow ----------- 9000 lbs./sec.
 Gas inlet temperature ------ 300° C.
 Channel outlet temperature ------------- 520° C.
 Maximum temperature of graphite in reactor core -------------------- 300° C.

(e) Pressure vessel supports:
| | |
|---|---|
| Total weight of pressure vessel and contents | 3600 tons. |
| Load on each hanger | 300 tons. |
| Material of hangers | High-tensile steel. |
| Thickness of hanger strips | 2 in. |
| Width of hanger strips | 12 in. |
| Length of hanger strips | 12 ft. |
| Radial force on each hanger | 8 tons. |
| Moment on each hanger | 57 tons-in. |
| Radial movement of pressure vessel | .95 in. |
| Diameter of ring beam | 35 ft. |
| Depth of ring beam | 4 ft. 2 in. |
| Material of ring beam | Mild steel. |
| Length of each strut | 17 ft. |
| Thickness of each strut | 2 ft. 6 in. |
| Angle of inwards inclination of each strut | 22½°. |
| Material of struts | Mild steel. |
| Mean diameter of corbel support | 45 ft. |

(f) Heat exchanger supports:
| | |
|---|---|
| Total weight of each heat exchanger | 600 tons. |
| Load on each hanger | 150 tons. |
| Material of hangers | High-tensile steel. |
| Number of hanger strips (for each hanger) | 8. |
| Thickness of hanger strips | ¾ in. |
| Width of hanger strips | 5 in. |
| Length of hanger strips | 10 ft. |
| Radial force on each hanger | 1.6 tons. |
| Tangential load (vertical direction) on each hanger | 150 tons. |
| Tangential load (horizontal direction) on each hanger | 1.2 tons. |
| Longitudinal moment on each hanger | 850 tons-in. |
| Circumferential moment on each hanger | 1.5 tons-in. |

(g) Concrete shielding:
| | |
|---|---|
| Thickness of concrete shielding around pressure vessel | 9 ft. |
| Thickness of concrete shielding about each heat exchanger | 2 ft. |
| Thickness of concrete shielding above pressure vessel | 4 ft. |

(h) Containment vessel 18:
| | |
|---|---|
| Diameter of containment vessel | 186 ft. |
| Nominal plate thickness | 1¼ in.–2 in. |
| Working pressure | 24 p.s.i. |
| Material | Lloyds P–5 steel. |

We claim:

1. A reactor system comprising, in combination: a spheroidal-shaped pressure vessel, a reactor core support structure contained within the pressure vessel, a reactor core carried by the core support structure, a heat exchanger external the pressure vessel, co-axial ducts disposed in a horizontal plane and inter-connecting the upper region of pressure vessel and heat exchanger to define inner and outer paths for coolant flow therebetween, support means for the heat exchanger allowing movement of the heat exchanger along the horizontal plane of the ducts, means for circulating a pressurised coolant in closed circuit through the reactor core and heat exchanger by way of said inner and outer paths, a base support structure disposed about the exterior of the pressure vessel, a series of struts disposed about the pressure vessel and extending upwards from the base support structure, a pressure vessel support member carried by the upper ends of the struts, a first series of hangers depending from connection points on the pressure vessel support member to connect with the pressure vessel in the horizontal plane of the ducts, the struts and the first series of hangers being thermally matched so as to maintain the plane of the ducts constant in relation to the base support structure with temperature changes in the system, a second series of hangers disposed within the pressure vessel and depending from connection points also within the plane of the ducts, and means connecting the lower ends of the second series of hangers with the core support structure.

2. The combination of claim 1 wherein the hangers of the first series depend in alignment with the hangers of the second series.

3. The combination of claim 1 wherein the support means for the heat exchanger comprises a pair of support members disposed one on each side of the heat exchanger and above the horizontal plane of the ducts and at least four hangers depending from connection points on the hanger members to connection points on the heat exchanger, the hangers being disposed in spaced relationship two on each side of the heat exchanger.

4. The combination of claim 3 wherein the hangers supporting the heat exchanger each comprise laminated strips interconnected at their extremities, the hangers each being disposed so that the major axes of cross-section of their respective strips are out of parallel with the line of the co-axial ducts.

5. The combination of claim 1 wherein the first series of hangers each comprise laminated strips inter-connected at their extermities, the hangers being disposed so that the major axes of cross-section of the strips of each hanger are at right angles to a radial line extending from the centre of the pressure vessel.

6. The combination of claim 1 wherein the reactor core support structure is stepped around its periphery to receive a complementary stepped portion of the reactor core.

7. For a reactor system comprising a spheroidal shaped pressure vessel enclosing a reactor core and an external heat exchanger connected to the pressure vessel by a generally horizontal duct, support means comprising: a base support structure disposed about the exterior of the pressure vessel, a series of struts disposed about the pressure vessel and extending upwards from the base support structure, a pressure vessel support member carried by the upper ends of the struts, a first series of hangers depending from connection points on the pressure vessel support member to connect with the pressure vessel in the plane of the duct, the struts and the first series of hangers being thermally matched so as to maintain the plane of the duct constant in relation to the base support structure with temperature changes in the system, a second series of hangers disposed within the pressure vessel and depending from connection points also within the plane of the duct, a core support structure disposed within the pressure vessel, means connecting the lower ends of the second series of hangers with the core support structure, a pair of support members disposed one on each side of the heat exchanger and above the plane of the duct, and a third series of hangers comprising at least four hangers depending from connection points on the support members to connection points on the heat exchanger, the hangers of said third series being disposed in spaced relationship two on each side of the heat exchanger.

8. The support means of claim 7, wherein the hangers of the first series are co-extensive with the hangers of the second series.

9. The support means of claim 7, wherein the hangers of said third series each comprise laminated strips interconnected at their extremities, and each disposed so that the major axes of cross-section of the strips are out of parallel with the line of the duct.

10. The support means of claim 7, wherein the first series of hangers each comprise laminated strips interconnected at their extremities and disposed so that the major axes of cross-section of the strips of each hanger are at right angles to a radial line extending from the center of the pressure vessel.

References Cited by the Examiner
UNITED STATES PATENTS
1,385,819  7/21  Freborg _____ 248—17 X
FOREIGN PATENTS
1,217,847  12/59  France.
1,232,143  10/60  France.

CARL D. QUARFORTH, *Primary Examiner.*
ROGER L. CAMPBELL, *Examiner.*